Jan. 13, 1959  M. P. LEBOURG  2,868,012
FLOWMETER
Filed Nov. 16, 1954  2 Sheets-Sheet 1

INVENTOR.
MAURICE P. LEBOURG
BY *William R. Sherman*
HIS ATTORNEY.

United States Patent Office 2,868,012
Patented Jan. 13, 1959

2,868,012

FLOWMETER

Maurice P. Lebourg, Houston, Tex., assignor, by mesne assignments, to Schlumberger Well Surveying Corporation, Houston, Tex., a corporation of Texas Application November 16, 1954, Serial No. 469,089

6 Claims. (Cl. 73—155)

This invention relates to apparatus for sensing the motion of a fluid and, more particularly, for measuring the rate and direction of fluid flow in a well or other flow passage.

The accurate measurement of fluid flow is of substantial importance in a wide variety of applications. For example, knowledge of the amount of any fluid entering or leaving the well at each depth derived from flow measurements may be used to govern operations for increasing or decreasing formation permeability or for perforating or plugging a well casing. Because appreciable volumes of fluid flowing through the wall of a well over an extended period of time may result in only a slight modification of vertical flow rates, accurate measurement is required.

Characteristically, however, the fluids of a well are contaminated with matter inimical to the operation of delicate flowmeters and are multiphase so that accurate calibration is difficult. In wells with permanently set production tubing, moreover, the most accurate of the prior art flowmeters are found either incapable of passing through the small diameter tubing or, if sized small enough for such passage, then generally inaccurate in measuring flow within the relatively large diameter casing below the tubing.

It is, therefore, an object of the present invention to provide new and improved apparatus for accurate and reliable measurement of fluid flow in a well or other flow passage.

Another object is to provide such apparatus which is capable of effective measurement of fluid flow in a well casing while sized to pass readily through production tubing.

Yet another object of this invention is to provide such apparatus yielding calibrated indications of the rate of flow and its direction.

These and other objects are attained by driving a paddle with and against any flow in a well or other flow passage and detecting the time sequence and magnitude of any changes in the load on the paddle as an indication of the direction and magnitude of fluid flow. In the preferred embodiment, an elongated housing contains a motor for driving the paddle about an axis running transversely through the housing.

The paddle, more specifically, is rotated in close proximity to a marker element carried on the housing, which serves momentarily to load the paddle by an increase in viscous drag. This momentary loading of the paddle together with any difference in loading of the paddle in moving with and against the fluid flow serve together as a measure both of the direction of flow and its rate. The embodiments of the invention illustrate different ways of detecting the loading upon the paddle and deducing therefrom the flow rate.

The invention together with others of its objects and advantages will be more clearly perceived from the following detailed description thereof taken in conjunction with the drawings, in which.

Figure 1:
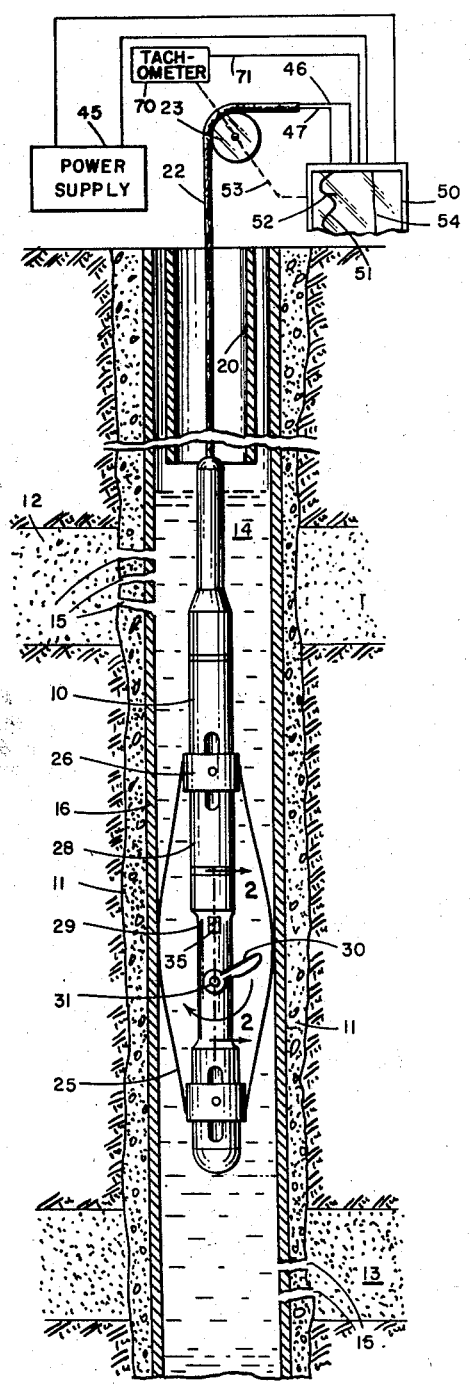
Fig. 1 is a front elevational schematic view of the apparatus embodying the invention showing the apparatus disposed in a cased well.

While of utility for flow measurements in a variety of passages, the invention is here described as used for well flow measurement. In Fig. 1, a housing 10 of slender elongated configuration is disposed in a bore 11 of a well between upper and lower permeable earth formations 12 and 13. Fluid 14 disposed within the bore 11 is in communication with the formations 12, 13 through perforations 15 formed in casing 16 and also in cement 17 by which the casing is set. In the upper portion of the well concentric with the casing 16 is shown production tubing 20 which, to best exemplify the advantages of this invention, may be that used for a permanent well completion.

To raise and lower the housing 10 in the well, conventional hoisting equipment is employed including an electric cable 22 and a drum 23 at the earth's surface over which the cable is passed. Conventional casing head apparatus which facilitates introduction and removal of both tools and fluid from the well is not shown here, being unnecessary to an understanding of the invention.

Introduction and removal of the housing 10 from the well requires, for permanent well completions, that the housing be sized to pass through the internal diameter of the production tubing 20 which is generally on the order of 2 inches. To this end, bowed springs 25 serving to center the housing in relation to the casing 16 are carried on slidable collars 26 which may be locked, as, for example, in the manner disclosed in Patent No. 2,669,688, issued February 16, 1954, to H. G. Doll, to hold the springs in collapsed position for passage through the production tubing 20. In the collapsed position of the springs 25, the maximum housing diameter may be on the order of 1¾ inches.

Detection of flow is accomplished by a portion of the housing conveniently located at its mid-section 28. This mid-section 28 includes a reduced diameter shank 29 carrying a dynamically balanced, single bladed paddle 30 rotatably on a shaft 31 journaled in the mid-section 28 on an axis extending transversely to the longitudinal dimension of the housing 10. As may best be discerned in Fig. 2, the reduced shank 29 of the mid-section 28 is offset laterally inwardly between shoulders 33 and 34 so that the paddle 30, when in its retracted position, will lie within the outlines of the mid-section 28 and hence will pass readily through the production tubing 20. A marker element 35 which fits closely about the tip 37 of the paddle 30 in its retracted position is carried by the reduced shank 29 on the same side as the paddle 30 so as likewise to lie within the outline of the mid-section 28.

Within the mid-section 28 the paddle shaft 31 is coupled to shaft 39 of an electric drive motor 40 by suitable means such as worm wheel 42 on shaft 31 and worm 43 on shaft 39. Power for the motor 40 may be supplied from any suitable source 45 at the surface with conductors 46 and 47 extending up the electric cable 22. In a convenient arrangement, the electric cable 22 may be armored with the armor serving as conductor 47 and an interior insulated wire serving as conductor 46.

In this embodiment of the invention, any flow of the fluid 14 at the level of the paddle 30 is detected as a sinusoidal modulation of the motor driving power attributable to a difference in viscous drag upon the paddle 30 as it moves with and against a movement of the fluid 14. An indicating device 50 is accordingly provided which may, for example, be a recording watt meter having a chart, either clock driven or externally driven, upon which variations in motor power are recorded. In the presence of fluid flow at the level of the paddle 30, then, a curve 51 will be recorded having a generally sinusoidal form with the amplitude serving as a measure of fluid flow. At the beginning of each cycle of the curve 51, a pulse 52 is superimposed on the sinusoidal wave form which results from the action of the marker element 35 as will be described more completely hereinafter. While the clock drive of the recorder 50 may suitably be employed where measurements of fluid flow are made with the housing 10 stationary at a given depth, an external drive 53 is provided which may be connected to the drum 23 to advance the recorder chart in synchronism with movement of the housing 10 through the bore 11. A curve 54 of cable velocity is desirably obtained for recording alongside curve 51, as by recording the signal of a tachometer 70 coupled to drive 53 and having electrical connection with recorder 50 as by conductor 71. In this fashion, the recorder 50 may be adapted for recording variations in fluid velocity continuously over a succession of levels in the well.

Figure 2:
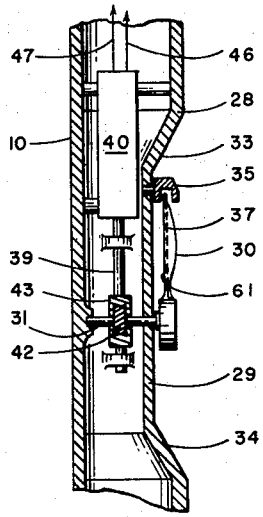
Fig. 2 is an enlarged sectional view of the housing taken on the line 2—2 of Fig. 1 and showing the paddle in the marker element.

In operation, stationary readings of fluid flow may be obtained by lowering the housing 10 to the desired depth in the casing 16 to facilitate lowering through the production tubing 20, the bowed springs 25 are locked in their retracted position and paddle 30 is positioned with its tip 37 in the marker element 35, as shown in Fig. 2. At the desired level, the motor 40 is energized to rotate the paddle 30 about the axis of its shaft 31. If there is no fluid flow at the level of the paddle 30, it will be evident that the power requirements for turning the paddle through each cycle of its rotation will be constant, the paddle being dynamically balanced with respect to gravitational forces. The recorder 50 is then operated concurrently with driving of the motor 40 over a period sufficient for obtaining a steady state reading.

In the event that a continuous record of fluid velocities over a succession of levels is desired, this may be obtained by running the housing 10 through the casing 16 at a known constant speed while advancing the chart of the recorder 50 through the cable drive 53. The component of velocity attributable to the movement of the housing is then subtracted at every level from any indication of flow obtained with the recorder 50, any remaining indication of flow representing the true velocity at a particular level. This subtraction may be carried out by ordinary arithmetic calculation by deducting the velocity of the housing from the velocity recorded by recorder 50, or else suitable automatic computer apparatus may be employed.

In either case, the rotation of the paddle tip 37 through the marker element 35 at the beginning of each rotary cycle serves to provide both an index of direction of flow and of viscosity of the fluid through which the paddle is rotating. It will be apparent that as the paddle tip 37 passes through the marker element 35, the close clearance will cause a momentary increase in drag and hence in power consumption which will be represented by the pulse 52. Knowing the direction of rotation of the paddle after it leaves the marker element 35, an observer may ascertain from the phase of the sign wave 51 in relation to the pulse 52 whether the paddle first moves with or against the direction of flow. For example, with rotation in the direction of the arrow as shown in Fig. 1, an increase in the load on the motor at the position shown would be indicative of upward flow of fluid, whereas a decrease would be indicative of downward flow. The measure of viscosity follows from the dependency of the pulse 52 in height upon the viscosity of the fluid encountered by the tip 37 in passing through the marker element 35.

The apparatus of Figs. 1 and 2 may also be operated as a null detector where flow is determined by the speed of the cable and its direction necessary to maintain a null flow indication on the recorder 50. In this case, cable speed recorded as curve 54 would provide an accurate indication of flow velocity opposite the null points of curve 51.

Figure 3:
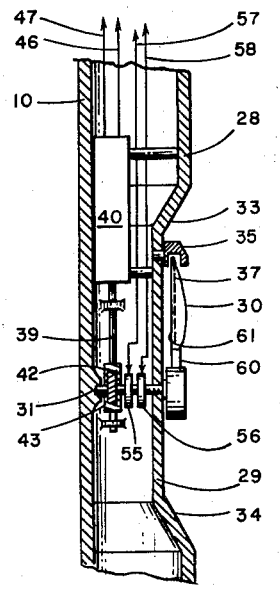
Fig. 3 is a view similar to that of Fig. 2 showing a modified version of the apparatus.
Figure 4:
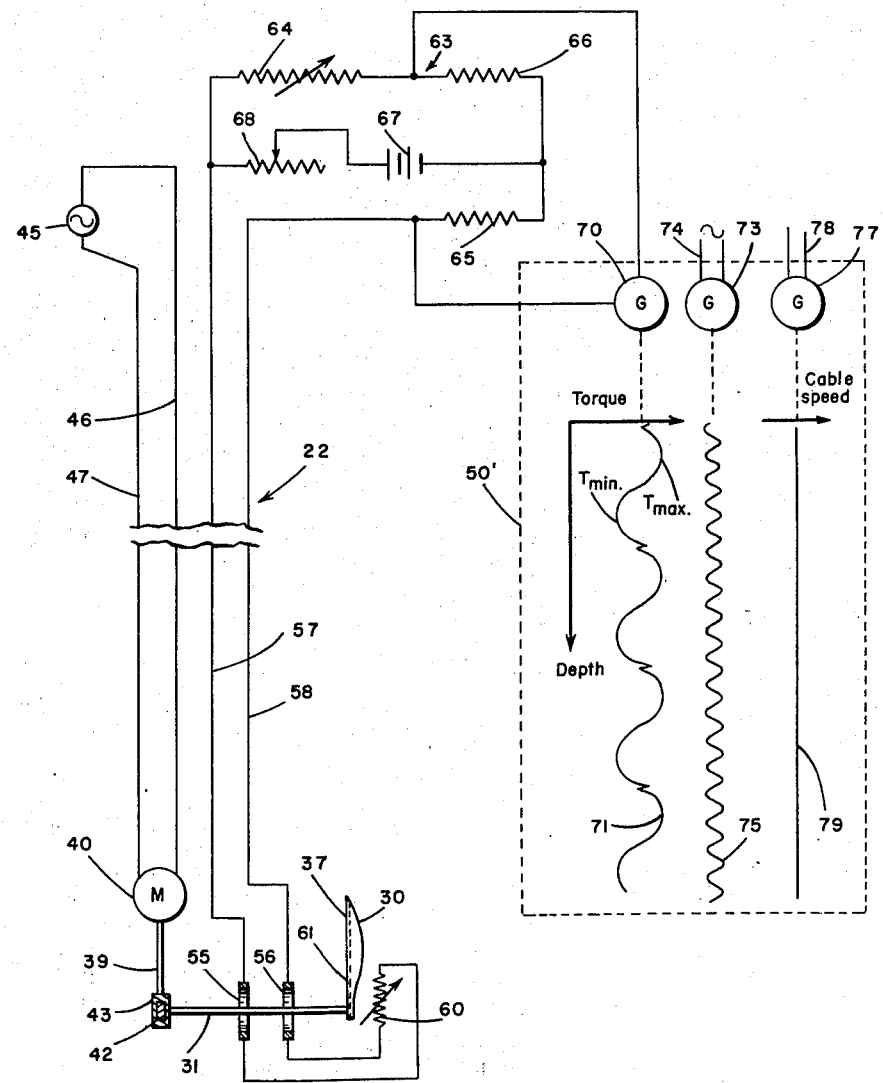
Fig. 4 is a schematic diagram showing a circuit and associated recorder for use with the apparatus of Figs. 1 and 3.

An alternative embodiment of the invention which leads to the attainment of a high accuracy of flow measurement is the modification of the apparatus of Fig. 1 shown in Figs. 3 and 4. The apparatus of Fig. 3 differs from that of Fig. 2 in the provisions for direct torque measurements, including the placement of slip rings 55 and 56 on the paddle shaft 31. These slip rings 55 and 56 provide a continuous connection between conductors 57 and 58, respectively, and a torque sensitive element 60 carried on the paddle 30 near its shank portion 61. While the torque sensitive element 60 may have a variety of particular forms, it is here shown as a variable resistance strain gauge of the type which may be bonded to the surface of the paddle shank 61 to detect deflections of the shank and hence, by a resultant variation in resistance, to afford an indication of variations in torque loading on the paddle 30.

As shown in Fig. 4, the strain gauge 60 is connected by conductors 57 and 58 of a three conductor cable into an arm of bridge circuit 63 with a resistor 64 in the arm adjacent thereto being of an adjustable type. In the opposite arms of the bridge 63 are identical fixed resistors 65 and 66. The circuit is energized from a steady potential supply such as battery 67 in series with rheostat 68 to constitute the diagonal of the bridge across resistors 64 and 66. Forming the measure diagonal of the bridge is a galvanometer 70 of a modified indicating device 50' shown as a multichannel galvanometric recorder.

While the recorder 50' may be clock driven for stationary measurements, it is shown here arranged for operation by the cable drive 53 so that the record is advanced in proportion to the movement of the housing 10 through the well. As a function of the depth then, curve 71 may be recorded representing the torque signal applied to galvanometer 70. In an adjacent channel, a galvanometer 73 having terminals 74 for connection to a suitable source of a timing signal provides a reference timing curve 75. A third galvanometer 77 is conveniently connected at terminals 78 to a source of a signal representing cable speed which may be recorded as curve 79 adjacent curves 71 and 75. It will be appreciated, however, that cable speed may be determined from the relationship of the timing curve 75 to the depth of the housing as indicated by advance of the record as a function of depth.

This alternative embodiment of the invention is similar in operation to the embodiment of Figs. 1 and 2 but with certain modifications. Thus, the bridge circuit 63 will normally be balanced prior to measurement when the paddle 30 is in a stationary reference position, such as the position shown in Fig. 3, without any torque loading. Balance, of course, may be obtained by adjusting resistor 64, while the signal strength at galvanometer 70 may be modified by adjustment of rheostat 68. The bridge 63 conveniently is energized when the level is reached where the motor 40 is energized for making a measurement.

The advantages of this arrangement for the measuring of flow will be apparent from a consideration of the following relationships. Assume the paddle 30 to be disposed in a horizontal position rotating in a known direction against a flow of fluid 14. The torque transmitted through the shank 61 of the paddle 30 will be a maximum $T_{max}$ determined by the following equation:

$$T_{max} = KA_{vg}(V+V_f)^2$$

where K is a constant coefficient depending upon the blade geometry, $A_{vg}$ is a variable coefficient depending upon the fluid characteristics such as viscosity $v$ and specific gravity $g$, V is the average linear velocity of the blade and $V_f$ is the flow to be determined. This point of maximum torque $T_{max}$ is indicated on the curve 71. One-half cycle later a minimum torque $T_{min}$ will be experienced by the paddle as it moves with the fluid flow. The expression for this minimum torque is as follows:

$$T_{min} = KA_{vg}(V-V_f)^2$$

Eliminating these coefficients K and $A_{vg}$ from the two equations, an expression is obtained from which the flow of velocity $V_f$ may be determined, as follows:

$$\frac{T_{max}}{T_{max}-T_{min}} = \frac{(V+V_f)^2}{4V \cdot V_f}$$

As $T_{max}$ and $T_{min}$ may be measured from the curve 71 and the value of the linear velocity V of the blade determined by measuring off the number of timing wave cycles on curve 75 corresponding to a cycle or half cycle of curve 71, it is clear that this expression permits a determination of fluid flow $V_f$. Most significant is the fact that this determination is obtained without necessitating any calibration dependent upon fluid characteristics or the blade geometry of the paddle 30.

Thus, while a high degree of accuracy is obtainable with either embodiment of the invention, the second of the described embodiments eliminates any need for calibration of the apparatus on the basis of well fluid characteristics and of hydrodynamic characteristics of its flow sensing paddle.

If the measurement of flow is obtained while the housing 10 is in motion, the cable speed recorded as curve 79 may be algebraically subtracted from the apparent velocity determined from the above relationship.

Because the paddle 30 is actively driven, extreme care need not be taken in the design of its shaft mounting and no particular blade configuration is required. The active movement of the blade, moreover, minimizes the likelihood that it will accumulate paraffin or other impurities. Most of the elements of the apparatus are of a rugged mechanical character or are otherwise not exposed to deteriorating forces. Hence, it may be expected that the apparatus will be extremely reliable in operation. Furthermore, because the paddle may be sized to experience an average of the flow through the casing cross section and yet may be retracted within the profile of the flowmeter housing, it is eminently suited to flow measurements in permanently completed wells.

The illustrated embodiments of the invention are, of course, subject to wide variations within the limits of the invention. For example, the paddle drive may swing the paddle through a 180° arc bounded by the longitudinal axis of the housing. Such an arrangement would facilitate retraction of the paddle for passage through tubing 20. In lieu of the marker element 35 and where an indication of viscosity proved unnecessary, simply retarding the shaft 31 once each revolution would serve adequately to provide a reference for directional determinations of fluid flow.

These and other modifications lying within the true scope and purview of the invention are intended to be included within the ambit of the appended claims.

I claim:

1. In apparatus for indicating fluid flow in a well, the combination comprising an elongated housing adapted for lowering into a well, a single bladed paddle rotatably mounted exteriorly of said housing on an axis transverse to said housing, motor drive means in said housing for rotating said paddle to move the same alternately with and against fluid flow, means continuously responsive to variations in the loading of said paddle in moving with and against fluid flow for producing a signal representing said variations, and recording means responsive to said signal for providing a time record of the amplitude of such variations.

2. In apparatus for indicating fluid flow in a well, the combination comprising an elongated housing, means including an electrical cable connected to said housing for lowering the same into a well, a single bladed paddle rotatably carried by said housing on an axis transverse to said housing, electric motor drive means in said housing for rotating said paddle to move alternatively with and against fluid flow, power means coupled to said cable for energizing said drive means, and means responsive to variations in the power supplied to said drive means for providing a record of the amplitude and rate of such variations.

3. In apparatus for indicating fluid flow in a cased well having production tubing permanently set therein, an elongated slender housing adapted for lowering into the well through said production tubing, said housing having a reduced portion providing a lateral recess, a single bladed paddle rotatably carried on said reduced portion of said housing with its axis extending transversely of said housing into said recess, drive means for rotating said paddle about said axis into and out of said recess, and means for detecting cyclic changes of loading on said paddle.

4. Apparatus as defined in claim 3, further comprising marker means carried by said housing and shaped to receive said paddle in closely fitted relationship and spaced longitudinally of said axis for providing a momentary loading on said paddle.

5. In apparatus for indicating fluid flow in a flow channel, an elongated housing adapted for positioning in a flow channel, a single bladed paddle rotatably carried exteriorly of said housing on an axis transverse to said housing, motor drive means in said housing for rotating said paddle alternately with and against fluid flow longitudinally of said channel, a marker element fixedly secured to said housing and arranged to momentarily load said drive means upon movement of said paddle through a given position, and means for detecting changes of loading on said paddle.

6. In apparatus for indicating fluid flow in a well, a housing adapted for lowering into a well, a paddle rotatably carried on a transverse axis mounted on said housing and extending exteriorly thereof, motor drive means in said housing for rotating said paddle alternately with and against fluid flow, a strain gauge mounted on said paddle and sensitive to the torque transmitted therethrough, a multichannel galvanometric recorder, means defining a bridge circuit which includes said strain gauge and a channel of said recorder arranged to record maximum and minimum values of the transmitted torque, means for applying to said recorder a timing signal for recording of a timing wave, and means for connecting said recorder with a source of a signal proportional to the speed of said housing to record a curve representative of said speed.

References Cited in the file of this patent

UNITED STATES PATENTS

| 2,334,920 | Gosline et al. | Nov. 23, 1943 |
| 2,591,478 | Turner | Apr. 1, 1952 |
| 2,703,493 | De Boisblanc | Mar. 8, 1955 |
| 2,741,917 | Piety et al. | Apr. 17, 1956 |

FOREIGN PATENTS

| 1,065,380 | France | Jan. 6, 1954 |